(12) United States Patent
Gerstel

(10) Patent No.: US 8,325,013 B2
(45) Date of Patent: Dec. 4, 2012

(54) RFID STORAGE SYSTEMS

(75) Inventor: Joachim Gerstel, Muhlheim (DE)

(73) Assignee: Joint Analytical Systems GmbH, Moers (DE)

(*) Notice: Subject to any disclaimer, the term of this patent is extended or adjusted under 35 U.S.C. 154(b) by 507 days.

(21) Appl. No.: 12/559,350

(22) Filed: Sep. 14, 2009

(65) Prior Publication Data
US 2009/0322486 A1 Dec. 31, 2009

Related U.S. Application Data

(63) Continuation-in-part of application No. PCT/EP2008/051929, filed on Feb. 18, 2008.

(30) Foreign Application Priority Data

Mar. 15, 2007 (DE) .......................... 10 2007 013 237

(51) Int. Cl.
H04Q 5/22 (2006.01)
(52) U.S. Cl. ...................... 340/10.1; 340/8.1; 340/572.1
(58) Field of Classification Search ................. 340/10.1, 340/10.3, 10.6, 8.1, 572.1, 572.4
See application file for complete search history.

(56) References Cited

U.S. PATENT DOCUMENTS

| 7,187,286 | B2 | 3/2007 | Morris et al. | |
| 2002/0190845 | A1* | 12/2002 | Moore | 340/10.3 |
| 2003/0117281 | A1* | 6/2003 | Sriharto et al. | 340/568.1 |
| 2004/0046698 | A1* | 3/2004 | Martin et al. | 343/700 MS |
| 2005/0024211 | A1* | 2/2005 | Maloney | 340/572.1 |
| 2005/0205673 | A1 | 9/2005 | Morris | |
| 2006/0102718 | A1 | 5/2006 | Kajino et al. | |
| 2006/0213964 | A1* | 9/2006 | Excoffier et al. | 235/375 |
| 2007/0017986 | A1* | 1/2007 | Carrender et al. | 235/435 |
| 2009/0026907 | A1* | 1/2009 | Davidowitz et al. | 312/407 |

FOREIGN PATENT DOCUMENTS

| DE | 10 2005 051595 | 5/2006 |
| EP | 1 829 816 | 9/2007 |
| JP | 08204609 | 8/1996 |
| JP | 08326370 | 12/1996 |
| JP | 20000154673 | 6/2000 |
| JP | 2004028595 | 1/2004 |
| JP | 2004271299 | 9/2004 |
| JP | 2005267078 | 9/2005 |
| JP | 2006023788 | 1/2006 |
| JP | 2006036389 | 2/2006 |
| JP | 2006056615 | 3/2006 |

(Continued)

Primary Examiner — Edwin Holloway, III
(74) Attorney, Agent, or Firm — Thorpe North & Western LLP

(57) ABSTRACT

The invention relates to a storage system comprising a repository, in which a plurality of different products can be stored, each of the products being equipped with a radio frequency identification (RFID) transponder, and an antenna for the identification of the products by means of the RFID transponder, characterized in that each repository location is equipped with an RFID antenna, and the product position, and/or the product identification can be detected by said antenna. The products equipped with an RFID transponder can be configured by racks for receiving sample containers having a product identification, and the position and sample identification can be stored in the RFID transponder of the associated rack. Each sample container is equipped with an RFID transponder for storing the respective sample identification. An antenna arrangement corresponding with the spatial arrangement of the sample container receptacles serves the readout of the sample identification associated with the sample containers and stored in the RFID transponders.

16 Claims, 3 Drawing Sheets

FOREIGN PATENT DOCUMENTS

| | | |
|---|---|---|
| JP | 2006229561 | 8/2006 |
| JP | 2006240868 | 9/2006 |
| JP | 2006327720 | 12/2006 |
| JP | 2008084225 | 4/2008 |
| WO | WO 2005/015465 | 2/2005 |
| WO | WO 2006/114812 | 1/2006 |
| WO | WO 2006/014813 | 9/2006 |

* cited by examiner

RFID STORAGE SYSTEMS

RELATED APPLICATIONS

This application is a continuation-in-part of International Application PCT/EP2008/051929 filed Feb. 18, 2008, and which specified the United States, and which is based on and claims priority to German Application DE 10 2007 013 237.0 filed Mar. 15, 2007.

TECHNICAL FIELD

The invention relates to a storage system comprising
(a) a storage adapted to store a plurality of different products, each of the products being provided with a radio frequency identification (RFID) transponder, and
(b) an antenna for identifying the products by means of the RFID transponder.

Radio frequency identification (RFID) is a method for identifying and/or localizing subjects. Products provided with an RFID-Transponder can be detected by means of an RFID antenna. Such an antenna reads the transponder identification. The product may then be identified with this identification.

PRIOR ART

It is known to provide storage systems with RFID technology. In particular, uses in libraries and supermarkets were described. The shopping cart in a supermarket filled with the products is detected and billed using the RFID transponder. Thereby, the price of each individual product need not be determined individually anymore.

Furthermore, it is known to use RFID technology to identify persons in, for example, passports.

WO 2006/014813 discloses a storage for monitoring the entry and exit of subjects which are provided with an RFID tag. A RFID detector is used for such monitoring which is positioned inside a closed storage. A computer controls the opening and closing of the front entrance and monitors the identification of the user.

DE 10 2005 051 595 A1 discloses a file security system with a document file wrapper having an RFID tag stuck thereon. Specific medium identification information is recorded on the RFID tag. A compartment sensor positioned in the filing cabinet detects the entry and exit of individual document file wrappers into and out of the filing cabinet. Several document file wrappers are detected each by a sensor. It is disadvantageous with such an assembly that the amount of document file wrappers allocated to one compartment sensor may be very large. An individual document file wrapper may then not be easily found anymore. With the disclosed file security system it may be unambiguously clarified at all times which documents have been removed from the file cabinet. However, the localization of such files is based on a common filing system.

WO 2005/015465 A1 discloses an article management system where the articles are provided with pricetags. The pricetags have an RFID tag. A storage management device receives the information stored on the RFID-tag and information about the position which are received by means of antennas which are arranged in the shelf compartments.

US 2005/0205673 A1 discloses a rack with integrated sample containers. The rack is provided with one or more RFID tags allocated to one, several or all samples. The RFID tag serves to identify the sample.

DISCLOSURE OF THE INVENTION

It is an object of the present invention to provide an assembly where the storage and especially the retrieving of stored products is facilitated and cheaper.

According to the invention this object is achieved in that each storage position is provided with an RFID antenna and the product position and/or product identification is adapted to be detected and/or displayed with such antenna.

Contrary to known systems an antenna at the storage position is allocated to each product. Thereby the product position can be easily detected. The product can be easily found. Furthermore, there is the possibility to provide the storage with display means which are adapted to be activated by a request. Such display means may be, for example, a light, especially an LED. However, different optical or acoustic display means may also be suitable. The display means generates a signal upon the entering of a request, by, for example, an input system of a connected computer. The signal indicates where the requested product can be found. The products can be laid down in chaotic manner, i.e. at any position within the storage. The exact position of the product can be indicated upon request by means of, for example, a touch screen. The products are easy to find at all times. This makes the stocking of the storage particularly cheap.

A particular advantage is achieved if an electronic storage is provided for storing the product position in the storage detected by the antenna together with product specific data, as well as means for entering a query regarding the product position.

In a particularly preferred modification of the invention the products provided with an RFID transponder are formed by racks for receiving sample containers with a sample identification and the RFID transponder and the respective racks are adapted to store the position and the sample identification. In this modification several sample containers are stored in the rack together and registered and localized through the transponder-antenna system. Especially in cases with very many products, such as samples in medical, pharmaceutical and laboratory areas, the use of very many antennas can be avoided.

Preferably each of the sample containers is additionally provided with an RFID transponder for storing the respective sample identification. The term "sample identification" contains not only information for denoting the sample but may also contain information about the kind, origin, generation date, etc.

In a particularly preferred modification of the invention an antenna assembly corresponding to the spatial arrangement of the sample container receptacles is provided for reading the sample identification corresponding to the sample containers and stored in the RFID transponders. The antenna assembly comprises just as many antennas as there are receptacle positions in the rack. The antennas are spatially distributed in the same way as the receptacle positions. If a rack is placed on the antenna assembly, each antenna reads the information of the RFID transponder of the corresponding sample container. Such plurality of information can be transmitted to the RFID transponder of the rack thereafter. Only one antenna assembly is necessary for racks of the same kind. This enables the individual registration of each sample without having to provide an individual antenna for each sample.

The position of the individual antennas within the antenna assembly can be transmitted to the RFID transponder of the rack together with the sample identification of the corresponding sample container as part of the product identification, it can be stored therein and read out by the antenna used for reading the storage position.

Preferably, means for the separate reading of the RFID transponder on an individual sample container are provided. With such an individual scanner it can be verified if the found individual sample is indeed the requested sample.

Preferably the storage is closed and access is provided with an authorizing device for checking authorization data. Contrary to supermarkets and libraries, the storage is not accessible for everybody. Thereby the risk of theft is considerably reduced. Furthermore, the storage is entirely independent of staff and can be operated, if suitable, without any storage administrator, sales person or service staff. Everybody who has a suitable access authorization must prove this at the authorization device before access. Human traffic into the storage is accordingly reduced by the authorization device.

The authorization device can comprise a card reader used to read a person identification card. Such person identification cards can be provided with a bar code, a magnetic strip, a microchip, a transponder or any other suitable technology. Also, the authorization by recognizing biometric features is suitable. It is also possible to use a card reader provided with image processing means and reading the printing on a card. The person identification card serves to unambiguously identify a person or organization who is granted access to the storage. Obviously the person or organization can also be represented by a number for a company account, a bank account, an ID-number or membership number or the like instead of a name.

In a further modification of the invention the authorization device comprises an input device for inserting a person specific code. Such an input device can be a keyboard or a touch screen or the like. Also, speech or image recording devices for entering the code or identifying a person is possible. For the authorization of the access, data may be used which are stored in the authorizing device. Additionally, the input device can comprise a card reader. The person specific code can be stored on the person identification card. In this case the authorizing device must not store data for the group of authorized people. On the contrary, the authorization of the access is effected by confirmation of data stored on the card by means of the input keyboard.

In a modification of the invention, means are provided for storing and/or transmitting product specific data together with the authorization data. The combination of authorization data with product specific data enables each removal to be attributed to a person or organization. Accordingly, the billing of removed products can be achieved without involving additional staff. The information transmitted by the transponders about prices, identification numbers or names of the products are billed to the account of the removing person.

The storage may also be a walk-in storage, such as a supermarket. However, the storage may also be a simple cabinet or a mobile storage.

Preferably, means for localizing the entire storage are provided if the storage is a mobile storage. Further storages of the same kind can be provided which are interconnected through a network. In a further modification of the invention, means are provided for searching the position and/or amount of stored products in all storages.

Further modifications of the invention are subject matter of the subclaims. An embodiment is described below in greater detail with reference to the accompanying drawings.

DESCRIPTION OF THE EMBODIMENT

Figure 1:
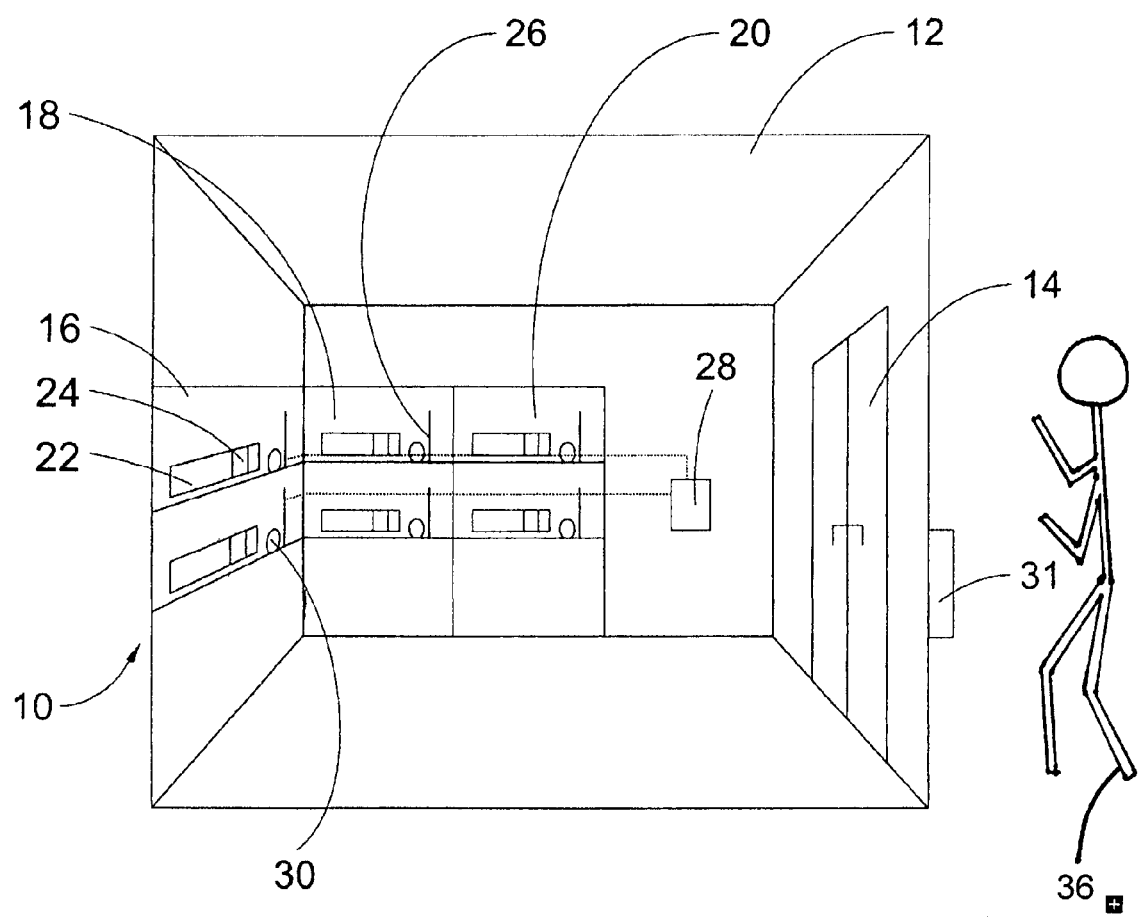
FIG. 1 schematically shows a walk-in assembly for storage.

In FIG. 1 a storage is shown which is generally denoted with numeral 10. The storage 10 comprises a closed room 12. The room 12 is provided with a door 14. The door 14 is generally closed. Shelves 16, 18 and 20 are provided in the room 12. The shelves 16, 18 and 20 serve to store various products 22.

Each individual product 22 is provided with a product identification which is stored in a RFID transponder 24 and can be read out therefrom.

An individual antenna 26 is provided in each compartment of the shelves 16, 18 and 20. Information stored on the RFID transponder of a product 22 stored in a respective compartment is received with such antennas 26. A data processing device 28 connected to the compartment antennas 26 is provided in the range of the room for reading the product identifications and localizing the products. The device 28 comprises a storage and computer means for evaluation of the received information. The localization of the products is effected by entering the product identification in the data processing device 28. This device determines the position of the corresponding shelf compartment by means of the antennas 26. An illuminated LED-display 30 shows the shelf compartment in which to find the product.

Outside the storage room 12 a terminal 31 is arranged in the range of the door 14. The terminal 31 comprises a card reader, a monitor and a keyboard. A bidirectional data exchange is effected between the data processing device 28 and the terminal 31.

If a person intends to remove a product 22 from the storage 10 he must prove his identity at first. The person 36 inserts his identification card, for example a credit card or a company identification card, into the card reader. The card reader reads the person-specific data from the identification card and saves the data. Furthermore, the card reader reads an identification code saved on the card. Afterwards, the person is requested through a monitor to insert the identification code (not shown) on the card by means of the keyboard. The inserted identification code is compared to the saved identification code. If the person is authorized to access the room and if he has entered the correct identification code, the door 14 is opened and the access into the storage 12 is granted. Further, other persons have no access to the storage while this person is still in the storage. The person 36 is now in the position to take the desired products 22.

By means of the RFID antennas 26 it is determined which products are removed from the storage by the person. The related product data are saved together with the data related to the person and transmitted to an account where the corresponding costs are billed.

Products with a position unknown to the person can be searched at the terminal. For this purpose the product name or the product identification is entered through a common selection and/or search function. The position of the product determined with the data processing device 28 and the antenna assembly 26 is indicated with the LED 30.

In the present embodiment, an individual antenna is provided for each individual product at each individual storage position. Alternatively, an individual Antenna is provided for each kind of product, such as, for example, a transport package. Both options enable the chaotic, i.e. disordered storage also in complex, large storages. The stocking with new products is essentially accelerated and can be carried out by quasi unqualified staff.

Figure 2:
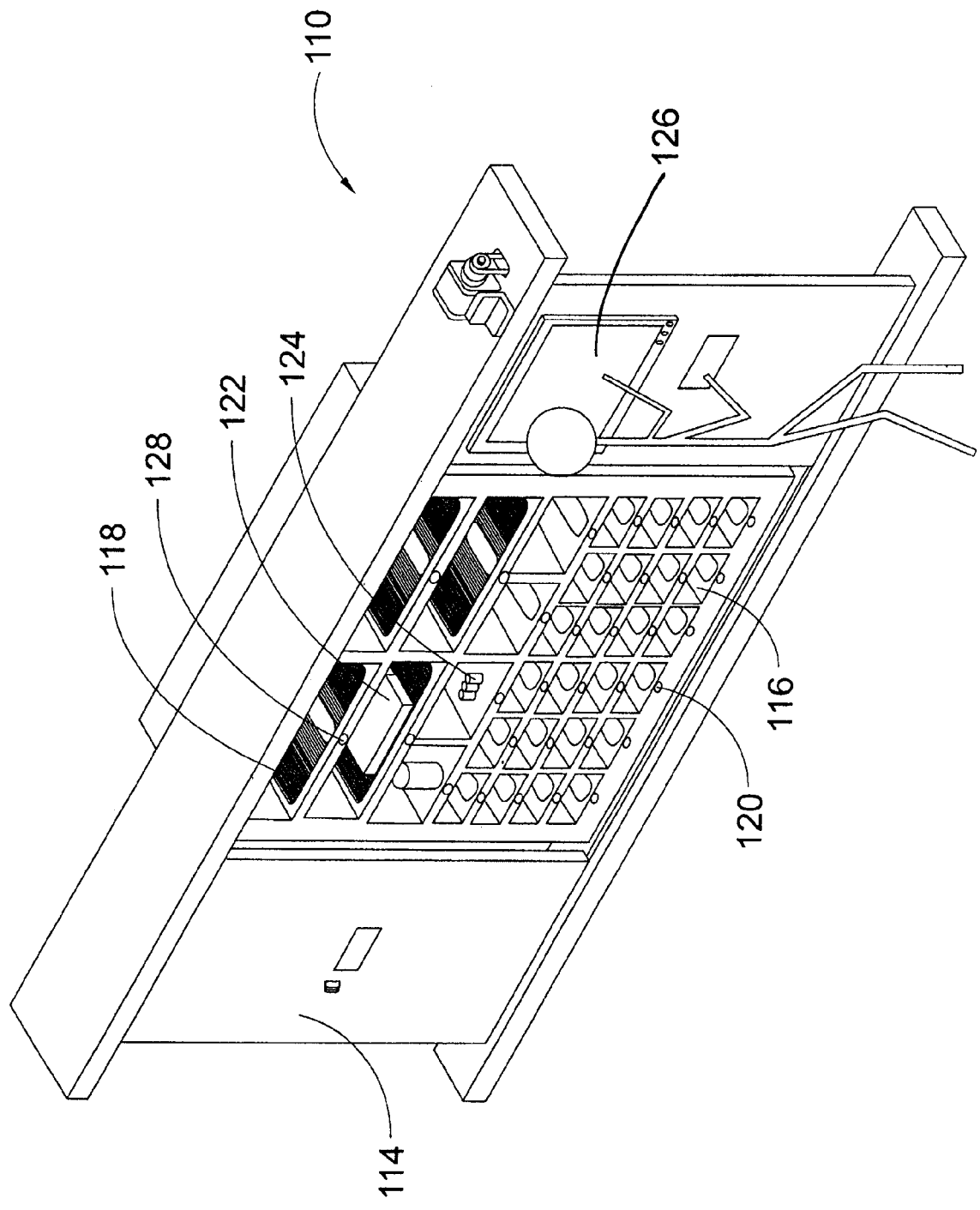
FIG. 2 schematically shows an assembly for storage with detectable storage position.

FIG. 2 shows an alternate embodiment. A storage 110 is designed as a not-walk-in storage. In the present case, the storage 110 is a laboratory cabinet for storing medical samples. The laboratory cabinet is provided with a suitable air-conditioning device. In particular, the laboratory cabinet can be a refrigerator or a cryogen device, if this is required by the samples.

Figure 3:
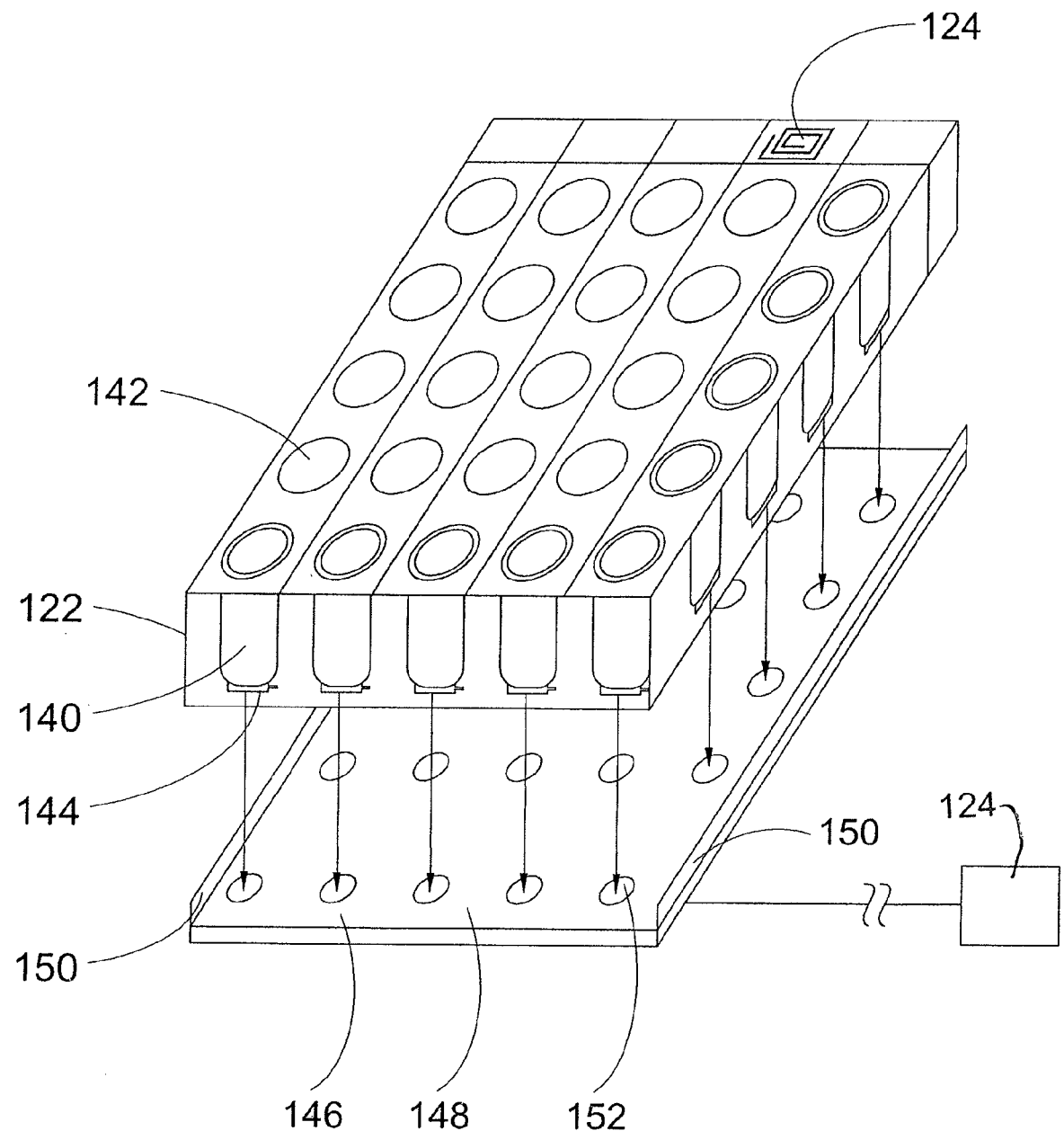
FIG. 3 shows a rack with a plurality of receptacles for receiving sample containers and a corresponding antenna assembly.

The laboratory cabinet 110 is closed by sliding doors 114. A plurality of storage positions 116, 118, also of different size, are provided in the laboratory cabinet. Each storage position is provided with an LED 120. Similar to the embodiment shown in FIG. 1, each product is provided with a transponder 124 and a product identification. In the present embodiment, the products are racks 122 with a plurality of sample containers 140. An example of such a rack 122 is shown in FIG. 3. Each storage position 116, 118 is here also provided with its own individual antenna used to determine if a rack is present at the storage position. If a rack 122 is present, the product identification can be read and evaluated using the transponder 124. A search for a rack 122 is carried out by entering a query at the terminal 126. A hit is indicated by illuminating an LED 128.

Each rack 122 is provided with receptacles 142 for a plurality of sample containers 140. Each sample container 140 is provided with its own individual transponder 144 on its bottom side. Information about the sample contained in the sample container 140 is stored in the individual transponder. It would be very expensive and time-consuming to provide an antenna for each and every of such sample containers 140, which reads the information of individual RFID transponder 144 provided at such a sample container. Therefore, an antenna assembly 146 belongs to the laboratory cabinet 110. The antenna assembly 146 comprises a base 148 with tracks 150. The rack 122 is mounted on such an antenna assembly 146. The tracks 150 ensure that the rack 122 is mounted in the same position on the antenna assembly 146 at all times. Obviously, different guiding mechanisms may be used instead of the tracks 150. The antenna assembly 146 is provided with a plurality of individual antennas 152. If the rack 122 is correctly mounted on the antenna assembly 146, each antenna 152 is positioned below one corresponding receptacle and can read the individual transponder 144 of the sample container 140 inserted in the receptacle 142.

The individual antennas 152 read the information from the individual transponders 144 and forwards the information to the transponder 124 of the rack 122. In such a way, information about all sample containers in a rack 122 are stored in the transponder 124 of this rack 122. Now the position of each individual sample container 144 can be unambiguously determined by a position numbering or other description of the position of the receptacle within the rack, for example in lines and columns. The advantage by this kind of proceeding is that the antenna assembly 146 with relatively expensive antennas 152 must be acquired only once for each kind of rack. Each rack 122 can be stored in a compartment without the antenna assembly after the information of the individual transponders 144 is read and stored in the common rack transponder 124.

When a certain sample container is desired, initially the LED of the rack is illuminated. When the rack 122 is removed from the compartment it can be determined where the desired sample container is present by means of the antenna assembly. An additional verifying assembly with an antenna for reading the individual transponder and for displaying the read information enables the checking of the sample container.

In a further modification of the invention, the storage is mobile and there are means for localizing the entire storage. Such a mobile storage can be, for example, a container or a truck. If there are several such storages of the same kind, the RFID technology provides the possibility to be used for inventory taking. It can be determined through remote enquiry which of the mobile storages contain a desired product and which of such storages is closest to the target, where the product is required.

In a further modification, a central server (master) is installed for the organization of several storages (slaves) which is connected to the authorizing devices and/or the antennas in order to avoid further data processing devices.

The present assemblies are designed in such a way that a product cannot be returned once it has been removed or registered as being bought. In case of a return, a separate inspection compartment is provided. Products can be deposited therein for inspection. If the product is without objection it will be credited to the corresponding account or the debit will be cancelled.

The foregoing detailed description describes the invention with reference to specific representative embodiments. However, it will be appreciated that various modifications and changes can be made without departing from the scope of the present invention as set forth in the appended claims. The detailed description and accompanying drawings are to be regarded as illustrative, rather than restrictive, and any such modifications or changes are intended to fall within the scope of the present invention as described and set forth herein.

What is claimed is:

1. A storage system comprising
(a) a storage adapted to store a plurality of different products having a storage position and a product identification, each of said products being provided with a radio frequency identification (RFID) transponder, and
(b) antennas for identifying said products by means of said RFID transponders, wherein each storage position is provided with one of said RFID antennas which is adapted to detect and/or display said storage position and/or said product identification,
and wherein
(c) said products provided with said RFID transponders are formed by racks for receiving samples or sample containers at a sample position, said samples or sample containers being provided with a sample identification and additionally with an RFID transponder for storing said sample identification; and
(d) said RFID transponders on said racks are adapted to store said sample position and said sample identification.

2. A storage system according to claim 1, wherein said samples or sample containers are arranged in a spatial arrangement in said rack and an antenna assembly with antenna positions corresponding to said spatial arrangement is provided for reading said sample identifications stored in said RFID transponders on said samples or sample containers.

3. A storage system according to claim 2, wherein means are provided for transmitting said antenna positions in said antenna assembly to said RFID transponder on said rack together with said sample identifications of said samples or sample containers and wherein said antenna positions and said sample identifications can be stored and read out by said antenna used for reading said storage position.

4. A storage system according to claim 2, and further having means for separate reading of said RFID transponders on an individual sample or sample container.

5. A storage system according to claim 1, wherein said storage is closed and access is provided with an authorizing device for checking authorization data.

6. A storage system according to claim 5, and further having means for storing and/or transmitting product specific data together with said authorization data.

7. A storage system according to claim 1, wherein an electronic storage is provided for storing said storage position in said storage detected by said antenna together with product specific data, as well as means for entering a query regarding said storage position.

8. A storage system according to claim 1, wherein said storage is a mobile storage and means are provided for localizing said entire storage.

9. A storage system according to claim 1, wherein further storages of the same kind are provided which are interconnected through a network.

10. A storage system according to claim 9, wherein means are provided for searching said position and/or amount of stored products in all storages.

11. A storage system according to claim 5, wherein said closed storage is a cabinet.

12. A storage system according to claim 11, and further having means for storing and/or transmitting product specific data together with said authorization data.

13. A storage system according to claim 11, wherein said authorizing device includes a card reader adapted to read a person identification card.

14. A storage system according to claim 11, wherein said authorizing device includes an input device for inserting a person specific code.

15. A storage system according to claim 5, wherein said authorizing device includes a card reader adapted to read a person identification card.

16. A storage system according to claim 5, wherein said authorizing device includes an input device for inserting a person specific code.

* * * * *